No. 681,626. Patented Aug. 27, 1901.
W. B. COWLES.
PNEUMATIC INDICATOR SYSTEM.
(Application filed May 28, 1901.)

(No Model.) 5 Sheets—Sheet 1.

Witnesses
Inventor
W. B. Cowles,
by Wilkinson & Fisher,
Attorneys

No. 681,626. Patented Aug. 27, 1901.
W. B. COWLES.
PNEUMATIC INDICATOR SYSTEM.
(Application filed May 28, 1901.)
(No Model.) 5 Sheets—Sheet 3.

No. 681,626. Patented Aug. 27, 1901.
W. B. COWLES.
PNEUMATIC INDICATOR SYSTEM.
(Application filed May 28, 1901.)
(No Model.) 5 Sheets—Sheet 4.

Witnesses
Inventor
W. B. Cowles
by Wilkinson & Fisher,
Attorneys

No. 681,626. Patented Aug. 27, 1901.
W. B. COWLES.
PNEUMATIC INDICATOR SYSTEM.
(Application filed May 28, 1901.)
(No Model.) 5 Sheets—Sheet 5.
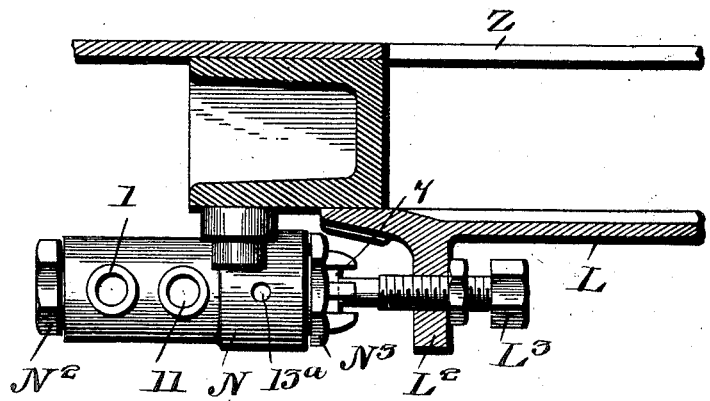
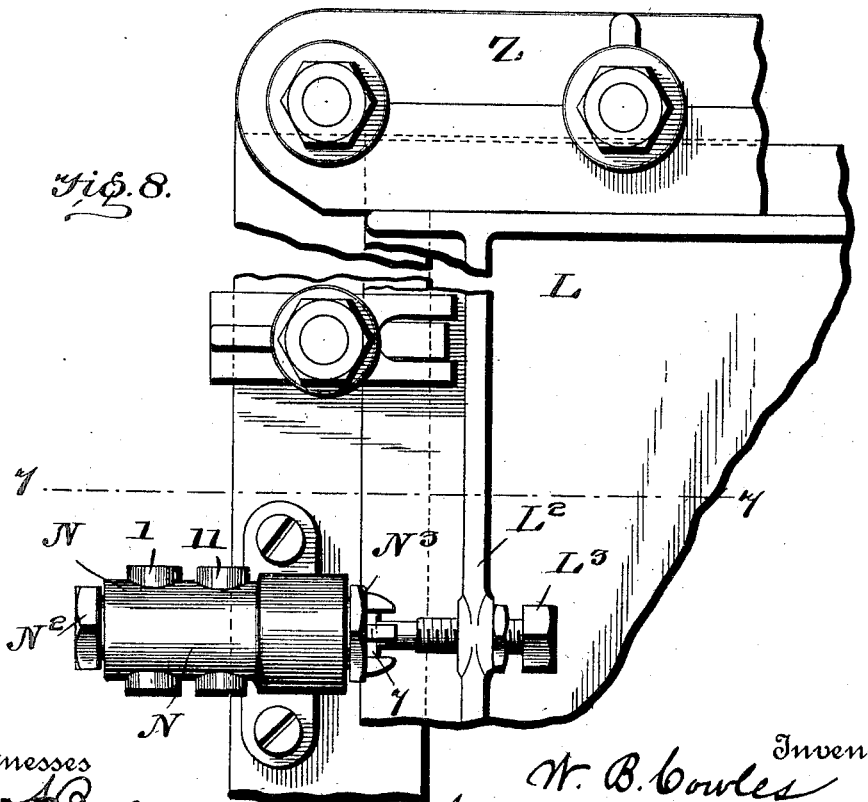

UNITED STATES PATENT OFFICE.

WILLIAM BARNUM COWLES, OF CLEVELAND, OHIO, ASSIGNOR TO THE LONG ARM SYSTEM COMPANY, OF SAME PLACE.

PNEUMATIC INDICATOR SYSTEM.

SPECIFICATION forming part of Letters Patent No. 681,626, dated August 27, 1901.

Application filed May 28, 1901. Serial No. 62,294. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Pneumatic Indicator Systems; and I do hereby declare the following to be a full, clear, and exact description of the invention, such as will enable others skilled in the art to which it appertains to make and use the same.

My present invention relates to pneumatic indicators adapted to indicate the application of pneumatic pressure at any given point or points and in this manner to indicate the position of a movable body or bodies. Thus when it is desired to indicate any particular position of a hatch, door, or other barrier the mechanism for operating the pneumatic indicator is located in the path of the hatch, door, or other barrier to be operated or of some object carried thereby at that particular point of its travel.

My invention is primarily intended to indicate when one or all of the bulkhead doors or hatches are closed in the pneumatic system devised by me and shown in my United States Patents No. 631,698, granted August 27, 1899, and No. 656,947, granted August 28, 1900, and in my application, Serial No. 59,272, filed May 8, 1901; but it may be applied to indicating any other position of the door or hatch, if desired, and may be also used with other barriers than those shown in the patents or the application aforesaid.

My invention will be understood by reference to the accompanying drawings, in which the device is shown as applied to the pneumatic system indicated in my two patents aforesaid and in which the indicator is used to show if one or more sliding doors is closed.

The same parts are indicated by the same characters throughout the several views.

Figure 1:
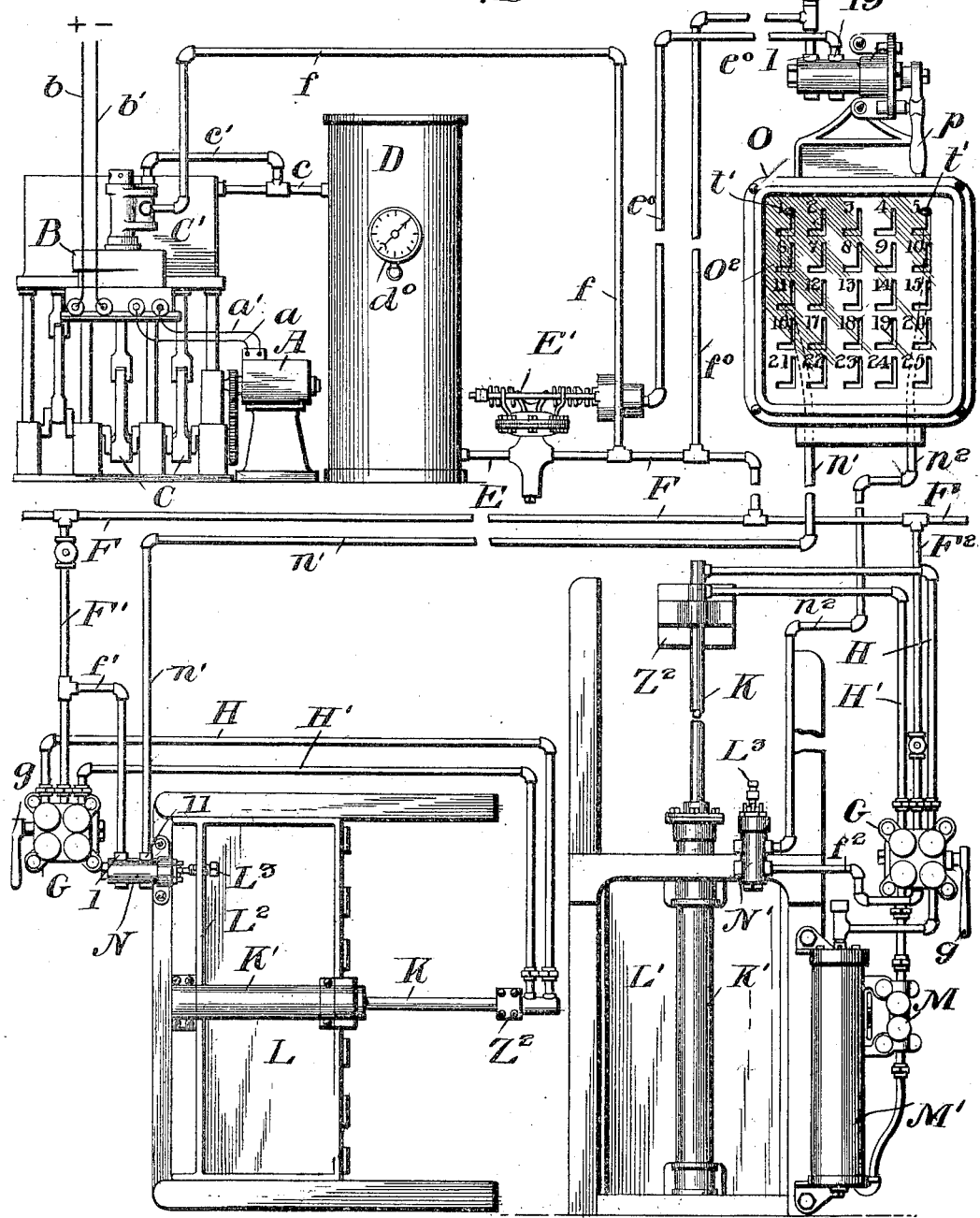
Figure 2:
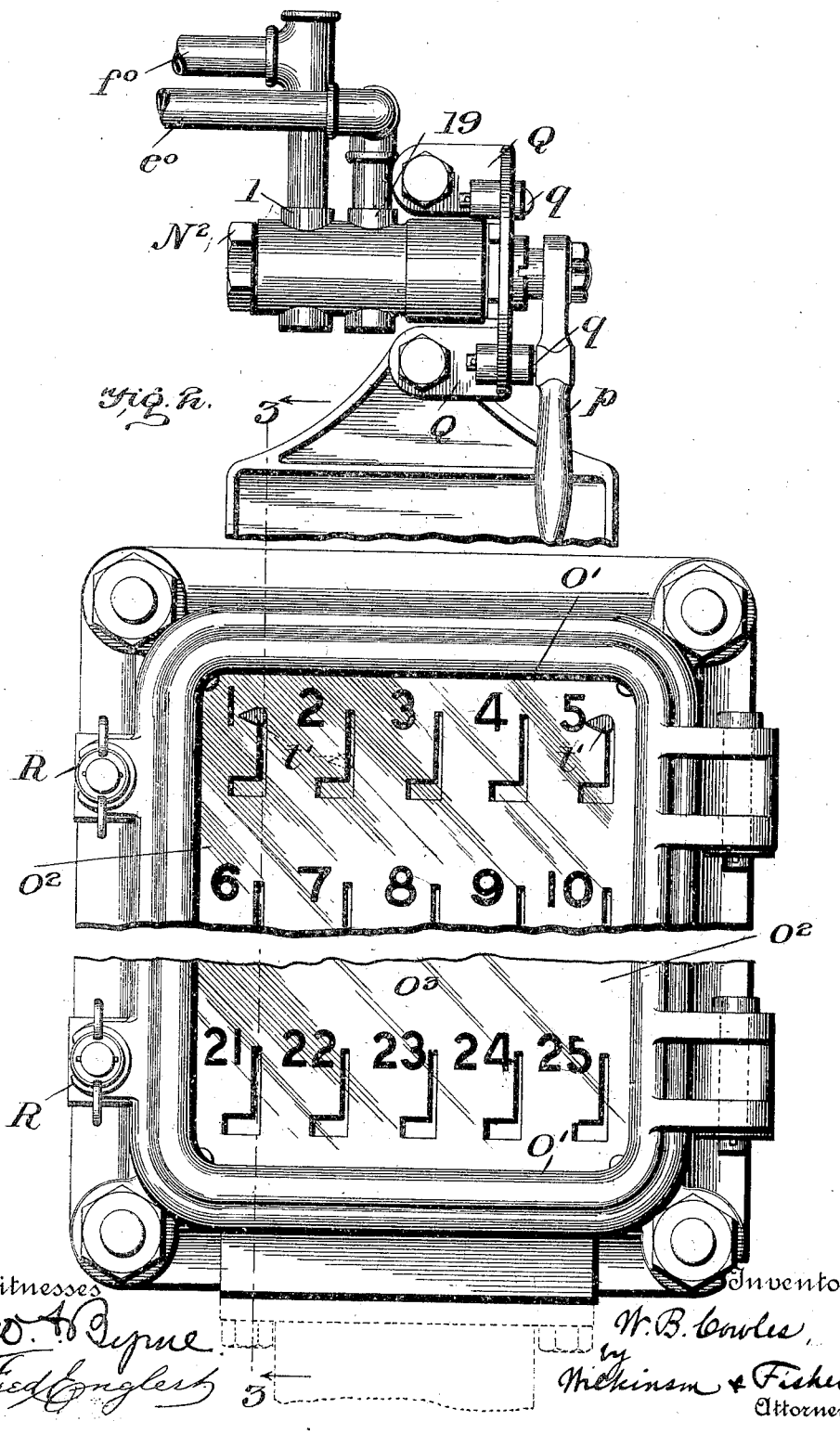
Figure 3:
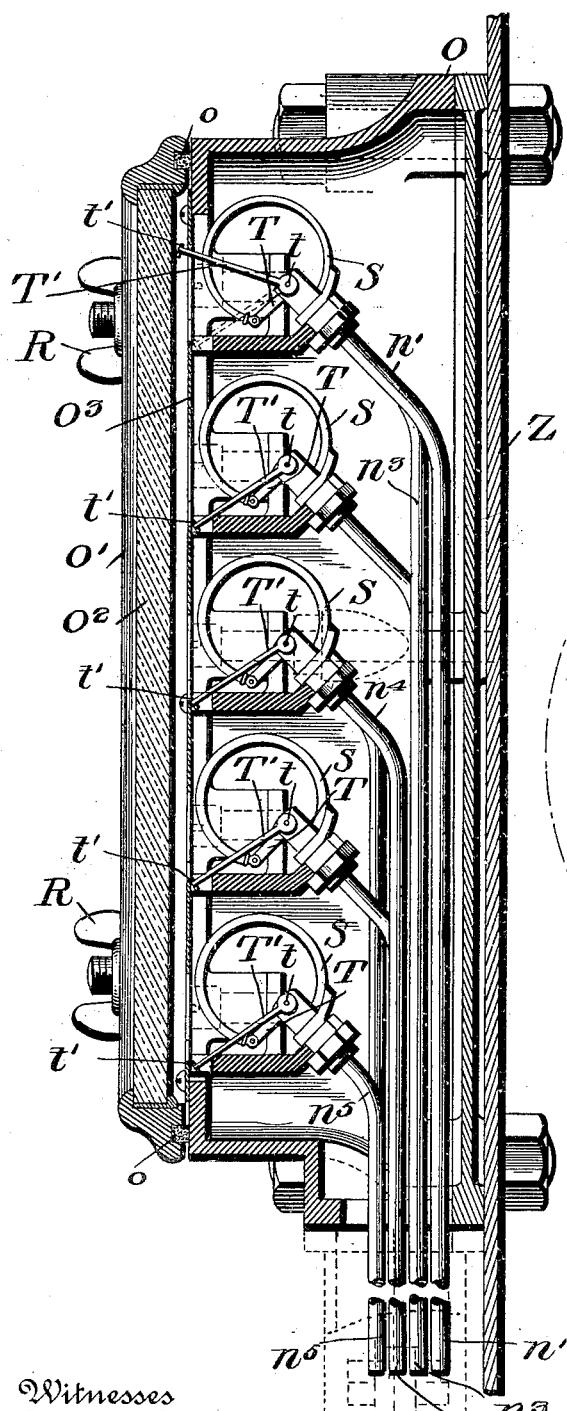
Figure 4:
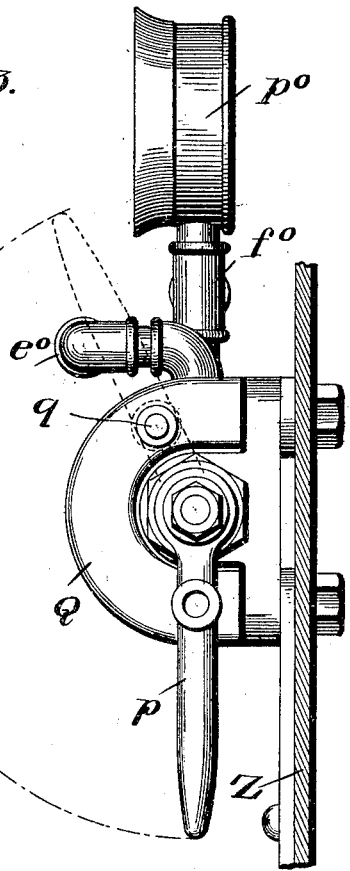
Figure 5:
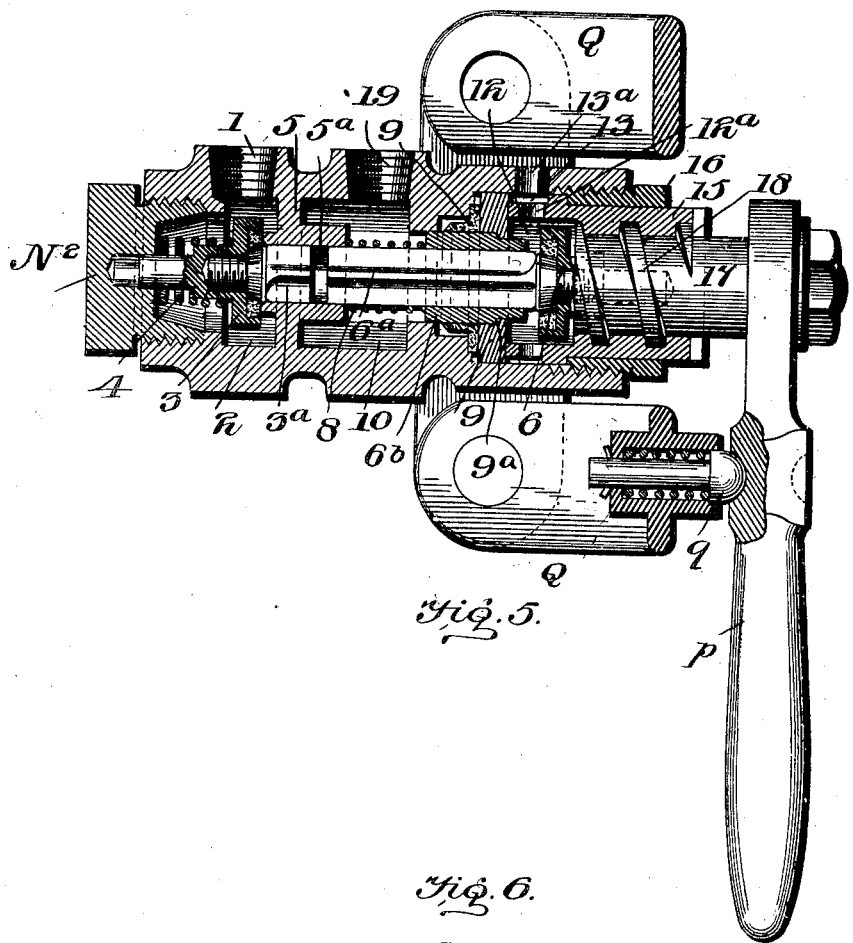
Figure 6:
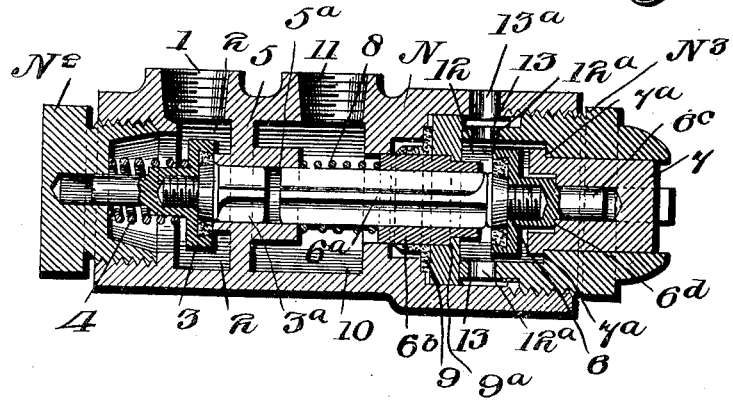

Figure 1 is a diagram showing the entire system, including the compressor, receiver, the reducing-valve, pneumatic indicator, a vertical and a horizontal sliding door, and other details of the apparatus that will hereinafter be more fully described. Fig. 2 is an enlarged detail view of the indicator-board and the emergency-valve mechanism adjacent thereto. Fig. 3 represents a section along the line 3 3 of Fig. 2 and looking in the direction of the arrows. Fig. 4 is an enlarged detail view of the emergency-valve mechanism. Fig. 5 is a still further enlargement showing the emergency-valve mechanism in section. Fig. 6 shows a section of one of the valve mechanisms located at the door for operating the indicator; and Figs. 7 and 8 show the valve mechanism at the door with the adjacent parts of the door and its frame, Fig. 7 being a section along the line 7 7 of Fig. 8 and the valve-casing being shown in plan.

Referring first to Fig. 1, A represents an electric motor fed by the conductors $a$ $a'$, leading from the autopneumatic switch B, described in my application, Serial No. 62,293, filed May 28, 1901, which makes connection with the conductors $b$ $b'$ from the source of electricity. (Not shown.) This electric motor drives the crank-shaft C, which operates the compressor C', forcing air under pressure through the pipe $c$ to the receiver D. This pipe $c$ is also connected by means of the pipe $c'$ to the autopneumatic switch, as described in my application aforesaid. The receiver $d$ may be provided with a pressure-gage $d^0$. The fluid-pressure from the receiver is delivered by means of the pipe E to the double pressure-reducing valve E', connected by the pipe $e^0$ to the emergency-valve mechanism, as will be hereinafter described. The working pressure is delivered by the reducing-valve to the fluid-pressure main F, which is connected to the valve mechanism G, located at the several doors. This valve mechanism is operated either from the central station or by hand by means of the handle $g$ in the manner fully described in my Patent No. 631,698 aforesaid and need not be further described herein. The fluid-pressure main F is also connected by means of the pipe $f$ to the autopneumatic switch, which operates in the manner described in my application, Serial No. 62,293, filed May 28, 1901, and the main F by means of the pipe $f^0$ is connected to the emergency-valve P, hereinafter to be described. Fluid-pressure is admitted from the valve mechanism G through the pipes H and H' to the double hollow piston-rod K and is delivered at either side of the piston in the cylinder K', connected to the sliding door in the manner fully described in my Patent No. 608,838, granted August 9, 1898.

L represents a door sliding horizontally, and L' a door sliding vertically; but the operation of the door-moving apparatus and the indicator is precisely the same whichever way the door moves.

M represents a hand-pump, and M' an auxiliary reservoir to supply liquid to the hand-pump, by means of which the door L' may be moved by hand independently, if desired; but this is not a part of my present invention.

N and N' are tappet-valve mechanisms connected to the door-frame and operated by push-pins or tappets $L^3$, adjustably connected to the door in any convenient way. For instance, the bolt $L^3$ may be screwed into the rib $L^2$ at the edge of the door, as shown in Figs. 1, 7, and 8. The valve mechanism N to indicate the closing of the door L is connected by means of the pipe $f'$ to the branch pipe F', leading from the main F, and also by the pipe $n'$ to the indicator-board. This pipe is shown as connected to the indicator marked "1," which shows that the door L is closed. The valve mechanism connected to the door L' is connected by means of the pipe $n^2$ to indicate "No. 5" on the indicator-board O and shows that door L' is closed. This valve mechanism N' is also connected by means of the pipe $f^2$ and the puppet-valve casing G to the branch pipe $F^2$, connected to the fluid-pressure main F.

$Z^2$ represents a bracket fast to the bulkhead Z, which bulkhead is not shown in Fig. 1, but is shown in Figs. 3, 4, and 7.

The construction of the valve mechanisms for operating the indicators is shown in Fig. 6, in which 1 represents a fluid-pressure inlet opening into the chamber 2 in the valve-casing, in which is located the inlet-valve 3, pressed on its seat by a spring 4, which spring bears against the screw-cap $N^2$, screwed into the valve-casing. The partition 5 in the valve-casing is provided with a hollow guide $5^a$, in which the guide-stem $3^a$ of the valve 3 travels, which guide-stem is fluted, as shown.

6 represents a release-valve having a fluted valve-stem $6^a$, on which is slidably mounted the collar $6^b$, sliding in the stuffing-box 9, which collar is normally pressed against the shoulder $9^a$ of the stuffing-box 9 by means of the spring 8. This valve 6 is moved by the push bolt or button 7, operated by the tappet $L^3$, as the door nears the closing position. The front end of the valve-stem $6^c$ projects into this push-button 7 and engages a shoulder $6^d$ thereon. The push-button 7 has a shoulder $7^a$, engaging the cap $N^3$, and thus holding the push-button against dropping out.

The chamber 10 is connected by means of the outlet 11 with the pipe $n'$, leading to the indicator-board. The stuffing-box 9 is pressed on its seat by means of the screw-cap $N^3$, and this screw-cap has a chamber 12, connected by a plurality of openings with the annular space 13, which is connected to the atmosphere by means of the outlet $13^a$. When the door is almost closed, the tappet $L^3$ strikes the push-button 7 and pushes in the release-valve 6 until it finds a bearing on the collar $6^b$, thus closing the passage from the chamber 10 to the chamber 12. After a short travel the fluted valve-stem $6^a$ strikes the fluted valve-stem $3^a$, lifting the inlet-valve 3 from its seat and allowing fluid-pressure to pass from the pipe $f'$ through the inlet 1, along the fluted valve-stem $3^a$ into the chamber 10, and thence through the outlet 11 to the pipe $n'$ and to the indicator-board. This pressure will remain shown on the indicator-board until the door is moved from the closed position or the pressure released. The door being closed, suppose it now to be opened. The first part of the opening motion will release the engagement of the tappet $L^3$ with the push-button 7, causing the pressure in the chamber 10, supplemented by that of the spring 8, to force back the collar $6^b$ until it finds a bearing on the shoulder $9^a$ of the stuffing-box 9, when its further motion is arrested. The valve 6, however, keeps on, due to the pressure in the chamber 10, until it reaches the end of its travel, being before this moved from its seat on the collar $6^b$. At the same time, but before the opening of the valve 6, the spring 4 will force the inlet-valve 3 on its seat. This will cut off any incoming supply of fluid-pressure, while that in the pipe $n'$ will flow into the chamber 10 through the port 11 and passing along the fluted valve-stem $6^a$ and through the chamber 12, the passage $12^a$, and the annular space 13 will escape to the atmosphere through the outlet $13^a$. This fall of pressure will instantly show on the indicator-board, as will be hereinafter described. The spring 8 need be merely strong enough to hold the collar $6^b$ normally in the position shown in Fig. 6 when there is no pressure on. The rise or fall of pressure occasioned by the operation of the valve on closing or opening the door is indicated on the indicator-board by the mechanism that will now be described.

The various pipes $n'$ $n^2$ $n^3$ $n^4$ $n^5$, &c., open into curved and flattened tubes S, similar to those used in the well-known Bourdon steam-pressure gage, which tubes are connected at their free ends by the rods T to any suitable and well-known multiplying movement on the shafts $t$, which shafts carry arms or needles T', with pointers $t'$, which pointers swing in and out of the bottom of the L-shaped openings in the opaque plate $O^3$, mounted beneath the glass plate $O^2$ in the cover O', which is hinged to the box O and is screwed down tight by means of the thumb-screw R. This cover is preferably made water-tight, as by means of the packing $o$. If the door is closed by the ordinary working pressure or by the hand-pump, the corresponding pointer $t'$ will swing only a part of the way up the vertical slot at one side of the L-shaped channel, as indicated in dotted lines at 2, (see Fig. 2,) while if the door be closed by the greater emergency pressure the pointer will swing all the way up, as shown in full lines near the top of Fig. 3 and also Fig. 2.

The several doors may be closed or opened separately by turning the handle $g$, but may be operated simultaneously by means of the emergency mechanism operated by the handle $p$. This emergency mechanism has been fully described in my Patent No. 631,698 aforesaid and will not be further described herein except in so far as the emergency-valve mechanism itself is concerned, which is shown in Figs. 4 and 5 and consists of an arrangement generally similar to that provided at the doors and shown in Fig. 6, the only substantial difference being that instead of being operated by a tappet and push-button I provide a screw-plug 17, screw-threaded at 18, which engages in the nut 15, held in place by means of the cap 16, which is screwed into the valve-casing. This nut 15 bears against the stuffing-box 9 and is provided with a number of openings $12^a$, opening into the annular chamber 13, which is connected to the outlet $13^a$. The handle $p$ for turning the screw 17 is held in either of two positions by means of the spring-catches $q$, mounted in the frame Q. When in the position shown in full lines in Figs. 4 and 5, the emergency system is cut off and the inlet-valve 3 is held on its seat by means of the spring 4 and the pressure in the chamber 2, which chamber is connected by means of the inlet 1 and pipe $f^0$ with the fluid-pressure main F. When the handle $p$ is turned to the position indicated in dotted lines in Fig. 4, the screw 17 will close the valve 6 and cause the fluted valve-stem $6^a$ to press the inlet-valve 3 off its seat, at the same time closing the passage to the outlets $13^a$, and fluid-pressure will pass through the inlet 1, chamber 2, and along the fluted valve-stem $3^a$ into the chamber 10 and through the outlet 19 and pipe $e^0$ to the double pressure-reducing valve E', by means of which increased pressure is permitted to pass the reducing-valve E', and thus the emergency pressure is turned onto the fluid-pressure main F.

The various puppet-valve mechanisms G and the group of doors controlled from the central station are all simultaneously operated in the manner described in my Patent No. 631,698 aforesaid.

The construction and arrangement of the reducing-valve E', by means of which the ordinary pressure—say one hundred and fifty pounds—is normally admitted to the main F, while the larger emergency pressure—say three hundred pounds—may be admitted to said main when desired, are not a part of my present invention, but are well known in the art and will not be further described.

While I have shown the invention as applied to the fluid-pressure system described in my patents and applications aforesaid, it will be obvious that the same and various details thereof may be operated by fluid-pressure from any suitable source or sources. It will also be obvious that various modifications of the herein-described apparatus and in the combination and arrangement of parts may be made which could be used without departing from the spirit of my invention.

Having thus described my invention, what I claim, and desire to secure by Letters Patent of the United States, is—

1. In a pneumatic system of the character described, the combination with a plurality of doors, hatches or other like barriers, of a source of fluid-pressure, mechanism for operating said barriers operated by said source of fluid-pressure, valve mechanism operated by the motion of the barrier at a predetermined part of its travel, a pneumatic or fluid-pressure indicator, and connections between said source of fluid-pressure, said valve mechanism, and said indicator, substantially as described.

2. In a pneumatic system of the character described, the combination with a plurality of doors, hatches or other like barriers, of a source of fluid-pressure, mechanism for operating said barriers operated by said source of fluid-pressure, valve mechanism operated by the motion of the barrier at a predetermined part of its travel, an indicator-board with a plurality of pneumatic or fluid-pressure indicators mounted therein, and fluid-pressure pipes from said source of fluid-pressure to the various valve mechanisms at the barriers and from thence to said indicator-board, substantially as described.

3. In a pneumatic system of the character described, the combination with a door, hatch or other like barrier, of a source of fluid-pressure, mechanism for moving said barrier operated by said source of fluid-pressure, valve mechanism operated by the motion of the barrier at a predetermined part of its travel connected to said source of fluid-pressure, a fluid-pressure indicator consisting of a bent tube made of resilient material, connected to said valve mechanism, and a pointer operated by said tube upon the variance of the pressure therein, substantially as described.

4. The combination with a plurality of doors, hatches or other like barriers, of means for moving said barriers, a source of fluid-pressure, valve mechanism connected to said source of fluid-pressure and operated by the motion of the barrier at a predetermined part of its travel, a fluid-pressure indicator and a pipe connecting said valve mechanism with said indicator, substantially as described.

5. The combination with a plurality of doors, hatches or other like barriers, of means for moving said barriers, a source of fluid-pressure, valve mechanism operated by the motion of each barrier at a predetermined part of its travel and connected to said source of fluid-pressure, an indicator-board with a plurality of pneumatic indicators mounted therein, and fluid-pressure pipes from the various valve mechanisms at the barriers to said indicator-board, substantially as described.

6. In a pneumatic system of the character described, the combination with a plurality of doors, hatches or other like barriers, of a source of fluid-pressure, mechanism for moving said barriers operated by said source of fluid-pressure, valve mechanisms operated by the motion of each barrier at a predetermined part of its travel connected to said source of fluid-pressure, fluid-pressure indicators consisting of bent tubes made of resilient material connected to said valve mechanisms, and pointers operated by said tubes upon the variance of the pressure therein, substantially as described.

7. In a pneumatic system of the character described, the combination with a plurality of doors, hatches or other like barriers, of a source of fluid-pressure, mechanism for operating said barriers operated by said source of fluid-pressure, valve mechanism comprising a tappet, an inlet-valve, and a release-valve operated by the motion of the barrier at a predetermined part of its travel, a pneumatic indicator, and connections between said source of fluid-pressure, said valve mechanism, and said indicator, substantially as described.

8. In a pneumatic system of the character described, the combination with a plurality of doors, hatches or other like barriers, of a source of fluid-pressure, mechanism for operating said barriers operated by said source of fluid-pressure, valve mechanism comprising a tappet, an inlet-valve, and a release-valve operated by the motion of the barrier at a predetermined part of its travel, an indicator-board with a plurality of pneumatic or fluid-pressure indicators mounted therein, and fluid-pressure pipes from said source of fluid-pressure to the various valve mechanisms, at the barriers and from thence to said indicator-board, substantially as described.

9. In a pneumatic system of the character described, the combination with a door, hatch or other like barrier, of a source of fluid-pressure, mechanism for moving said barrier operated by said source of fluid-pressure, valve mechanism comprising a tappet, an inlet-valve, and a release-valve operated by the motion of the barrier at a predetermined part of its travel connected to said source of fluid-pressure, an indicator consisting of a bent tube made of resilient material connected to said valve mechanism, and a pointer operated by said tube upon the variance of the pressure therein, substantially as described.

10. In a pneumatic system of the character described, the combination with a plurality of doors, hatches or other like barriers, of a source of fluid-pressure, mechanism for operating said barriers operated by said source of fluid-pressure, valve mechanism operated by the motion of the barrier at a predetermined part of its travel, consisting of a tappet on said barrier, a valve-casing, an inlet-valve and a release-valve with fluted stems mounted in said casing, and controlling said passages, the said valves being operated by said tappet, a pneumatic indicator, and connections between said source of fluid-pressure, said valve-casing, and said indicator, substantially as described.

11. In a pneumatic system of the character described, the combination with a plurality of doors, hatches or other like barriers, of a source of fluid-pressure, mechanism for operating said barriers operated by said source of fluid-pressure, valve mechanism operated by the motion of the barrier at a predetermined part of its travel, consisting of a tappet on said barrier, a valve-casing, an inlet-valve and a release-valve with fluted stems mounted in said casing, an indicator-board with a plurality of pneumatic or fluid-pressure indicators mounted therein, and fluid-pressure pipes from said source of fluid-pressure to the various valve-casings at the barriers and from thence to said indicator-board, substantially as described.

12. In a pneumatic system of the character described, the combination with a door, hatch or other like barrier, of a source of fluid-pressure, mechanism for moving said barrier operated by said source of fluid-pressure, valve mechanism operated by the motion of the barrier at a predetermined part of its travel connected to said source of fluid-pressure, the said valve mechanism consisting of a tappet on said barrier, a valve-casing, an inlet-valve and a release-valve with fluted stems mounted in said casing, a fluid-pressure indicator consisting of a bent tube made of resilient material, connected to said valve-casing, and a pointer operated by said tube upon the variance of the pressure therein, substantially as described.

13. The combination with a plurality of doors, hatches or other like barriers, of means for moving said barriers, a source of fluid-pressure, valve mechanism comprising a tappet, an inlet-valve, and a release-valve, connected to said source of fluid-pressure and operated by the motion of the barrier at a predetermined part of its travel, a fluid-pressure indicator and a pipe connecting said valve mechanism with said indicator, substantially as described.

14. The combination of a plurality of doors, hatches or other like barriers, of means for moving said barriers, a source of fluid-pressure, valve mechanism comprising a tappet, an inlet-valve, and a release-valve, operated by the motion of said barrier at a predetermined part of its travel and connected to said source of fluid-pressure, an indicator-board with a plurality of pneumatic or fluid-pressure indicators mounted therein, and fluid-pressure pipes from the various valve mechanisms at the barriers to said indicator-board, substantially as described.

15. In a pneumatic system of the character described, the combination with a plurality of doors, hatches or other like barriers, of a source of fluid-pressure, mechanism for moving said barriers operated by said source of fluid-pressure, valve mechanisms, comprising a tappet, an inlet-valve and a release-valve, operated by the motion of each barrier, at a predetermined part of its travel, and connected to said source of fluid-pressure, fluid-pressure indicators consisting of bent tubes made of resilient material connected to said valve mechanisms, and pointers operated by said tubes upon the variance of the pressure therein, substantially as described.

16. The combination with a plurality of doors, hatches or other like barriers, of means for moving said barriers, a source of fluid-pressure, valve mechanism, connected to said source of fluid-pressure and operated by the motion of the barrier at a predetermined part of its travel, consisting of a tappet on said barrier, a valve-casing, an inlet-valve and a release-valve with fluted stems mounted in said casing, and controlling said passages, the said valves being operated by said tappet, a fluid-pressure indicator and a pipe connecting said valve-casing with said indicator, substantially as described.

17. The combination of a plurality of doors, hatches, or other like barriers, of means for moving said barriers, a source of fluid-pressure, valve mechanism operated by the motion of each barrier at a predetermined part of its travel and connected to said source of fluid-pressure, the said valve mechanism consisting of a tappet on said barrier, a valve-casing, an inlet-valve and a release-valve with fluted stems mounted in said casing, and controlling said passages, the said valves being operated by said tappet, an indicator-board with a plurality of pneumatic or fluid-pressure indicators mounted therein, and fluid-pressure pipes from the various valve-casings at the barriers to said indicator-board, substantially as described.

18. In a pneumatic system of the character described, the combination with a plurality of doors, hatches or other like barriers, of a source of fluid-pressure, mechanism for moving said barriers operated by said source of fluid-pressure, valve mechanism, consisting of a tappet on said barrier, a valve-casing, an inlet-valve and a release-valve with fluted stems mounted in said casing, and controlling said passages, the said valves being operated by said tappet, operated by the motion of each barrier at a predetermined part of its travel and connected to said source of fluid-pressure, fluid-pressure indicators consisting of bent tubes made of resilient material connected to said valve-casings, and pointers operated by said tubes upon the variance of the pressure therein, substantially as described.

In testimony whereof I affix my signature in presence of two witnesses.

WILLIAM BARNUM COWLES.

Witnesses:
M. J. RUDOLPH,
C. C. PRESCOTT.